United States Patent [19]

Mussell

[11] Patent Number: 5,869,416
[45] Date of Patent: Feb. 9, 1999

[54] ELECTRODE INK FOR MEMBRANE ELECTRODE ASSEMBLY

[75] Inventor: Robert D. Mussell, Midland, Mich.

[73] Assignee: The Dow Chemical Company, Midland, Mich.

[21] Appl. No.: 904,258

[22] Filed: Jul. 31, 1997

Related U.S. Application Data

[62] Division of Ser. No. 554,066, Nov. 6, 1995, Pat. No. 5,702,755.

[51] Int. Cl.⁶ .................................................. H01M 4/86
[52] U.S. Cl. ............................... 502/101; 429/40; 429/42
[58] Field of Search .................................. 429/30, 42, 33, 429/40, 41; 502/101

[56] References Cited

U.S. PATENT DOCUMENTS

| | | | |
|---|---|---|---|
| 3,733,221 | 5/1973 | Sandler et al. | 136/120 |
| 4,215,183 | 7/1980 | MacLeod | 429/30 |
| 4,287,232 | 9/1981 | Goller et al. | 427/113 |
| 4,469,579 | 9/1984 | Covitch et al. | 204/283 |
| 4,505,992 | 3/1985 | Dettling et al. | 429/36 |
| 4,602,426 | 7/1986 | Kampe et al. | 29/623.1 |
| 4,847,173 | 7/1989 | Mitsunaga et al. | 429/41 |
| 4,927,514 | 5/1990 | Solomon et al. | 204/290 R |
| 4,940,525 | 7/1990 | Ezzell et al. | 204/252 |
| 5,037,917 | 8/1991 | Babb | 526/242 |
| 5,037,918 | 8/1991 | Babb | 526/242 |
| 5,037,919 | 8/1991 | Clement et al. | 526/242 |
| 5,108,849 | 4/1992 | Watkins et al. | 429/30 |
| 5,171,644 | 12/1992 | Tsou et al. | 429/12 |
| 5,211,984 | 5/1993 | Wilson | 427/115 |
| 5,234,777 | 8/1993 | Wilson | 429/33 |
| 5,252,410 | 10/1993 | Wilkinson et al. | 429/33 |
| 5,300,370 | 4/1994 | Washington et al. | 429/34 |
| 5,316,871 | 5/1994 | Swathirajan et al. | 429/33 |
| 5,330,860 | 7/1994 | Grot et al. | 429/42 |
| 5,395,705 | 3/1995 | Door et al. | 429/42 |
| 5,415,888 | 5/1995 | Banerjee et al. | 427/125 |
| 5,514,486 | 5/1996 | Wilson | 429/30 |
| 5,521,020 | 5/1996 | Dhar | 429/142 |
| 5,620,807 | 4/1997 | Mussell et al. | 429/33 |

FOREIGN PATENT DOCUMENTS

| | | |
|---|---|---|
| 0 064 389 | 11/1982 | European Pat. Off. . |
| 0 276 987 | 8/1988 | European Pat. Off. . |
| 0 305 565 | 3/1989 | European Pat. Off. . |
| 0 357 077 | 3/1990 | European Pat. Off. . |
| 0 364 297 | 4/1990 | European Pat. Off. . |
| 0 560 295 | 9/1993 | European Pat. Off. . |
| 0 577 291 | 1/1994 | European Pat. Off. . |
| 0 629 015 | 12/1994 | European Pat. Off. . |
| 0 687 023 | 12/1995 | European Pat. Off. . |
| 0 718 903 | 6/1996 | European Pat. Off. . |
| 61 052 383 | 7/1986 | Japan . |
| 6-333574 | 12/1994 | Japan . |
| 94/05049 | 3/1994 | WIPO . |
| 94/25993 | 11/1994 | WIPO . |
| 95/30474 | 11/1995 | WIPO . |
| 96/12316 | 4/1996 | WIPO . |
| 97/13287 | 4/1997 | WIPO . |

OTHER PUBLICATIONS

Arnett et al., Journal of the American Chemical Society, vol. 96, No. 12, pp. 3875–3891 (1974) *no month available.

Catalan et al., Journal of the American Chemical Society, vol. 112, pp. 1678–1681 (1990) *no month available.

Chemical Abstract No. 14273q, vol. 105, No. 2 (1986) *no month available.

Exploratory Fuel Cells for Transportation Program at Los Alamos National Laboratory, Washington, DC (Dec. 8, 1994).

Extended Abstracts Fall Meeting 1995, Oct. 8/13, St. Louis, Missouri, vol. 95/2, pp. 1043–1044.

Kamlett et al., Journal of Organic Chemistry, vol. 48, pp. 2877–2887 (1983) *no month available.

Le Questel et al., J. Chem. Soc. Perkin Trans. 2, pp. 2091–2094 (1992) *no month available.

Springer et al., J. Electrochem. Soc., vol. 140, No. 12 (Dec. 1993).

Watkins, David E., Fuel Cells for Transportation—Core Research Program at Los Alamos National Laboratory (Dec. 8, 1994).

Wilson et al., Extended Abstracts, vol. 95–2, pp. 1043–1044 (Oct. 8–13, 1995).

Patent Abstracts of Japan, JP 61 052 383, vol. 10, No. 214 (Jul. 25, 1986).

Murphy, O. J. et al., Journal of Power Sources, vol. 47, No. 3, pp. 353–368 (1994). *no month available.

Uchida, M. et al., J. Electrochem. Soc., vol. 142, No. 2, pp. 463–468 (Feb. 1995).

*Primary Examiner*—Bruce F. Bell

[57] ABSTRACT

A composition comprising (a) catalytically-active particles, (b) an organic compound having a pKa of at least about 18 and a basicity parameter, $\beta$, of less than 0.66, and (c) a polymeric binder. Also described is a process for preparing a membrane/electrode assembly, which comprises the sequential steps of (i) applying a layer of the composition of the invention to a solid polymer electrolyte, a carbon fiber paper, or a release substrate; (ii) heating the composition under conditions sufficient to volatilize at least 95 percent of component (b); and (iii) positioning the composition in contact with the solid polymer electrolyte, if the composition was not applied directly to the solid polymer electrolyte, forming the membrane/electrode assembly thereby. It has been discovered that the composition and process of the invention, when used to prepare a membrane electrode assembly (MEA) having a solid polymer electrolyte, provides an MEA which provides a relatively high voltage at a given current density and gas flow rate in a fuel cell.

6 Claims, 2 Drawing Sheets

ELECTRODE INK FOR MEMBRANE ELECTRODE ASSEMBLY

CROSS-REFERENCE TO RELATED APPLICATION

This is a continuation of application Ser. No. 08/554,066 filed Nov. 6, 1995, now U.S. Pat. No. 5,702,755.

BACKGROUND OF THE INVENTION

This invention relates to a membrane and electrode structure composed of an ion exchange membrane having a plurality of electrically-conductive, catalytically-active particles present on one, or both, surfaces of an ion exchange membrane. These membrane and electrode structures are particularly useful in fuel cells and electrolytic cells.

It is known to prepare membrane and electrode structures by depositing a catalyst ink comprising catalytically-active particles, a suspension medium comprising a hydrocarbon having an ether, epoxy, or ketone linkage and an alcohol group, and a binder, onto a solid polymer electrolytic material such as a polymeric membrane as described, for example, in U.S. Pat. No. 5,330,860. U.S. Pat. No. 5,234,777 describes solid polymer electrolyte membrane assemblies consisting essentially of a solid polymer electrolyte membrane and a composite film of a supported platinum catalyst and a proton-conducting ionomer with a thickness less than about 10 $\mu$m and a platinum loading of less than about 0.35 mg Pt/cm$^2$. However, the performance of such structures in a proton exchange membrane fuel cell may be less than desirable for certain fuel cell applications.

SUMMARY OF THE INVENTION

In one aspect, this invention is a composition comprising (a) catalytically-active particles, (b) an organic compound having a pKa of at least about 18 and a basicity parameter, $\beta$, of less than 0.66, and (c) a polymeric binder.

In a second aspect, this invention is a process for preparing a membrane/electrode assembly, which comprises the sequential steps of (i) applying a layer of the composition of the first aspect of the invention to a solid polymer electrolyte, a carbon fiber paper, or a release substrate; (ii) heating the composition under conditions sufficient to volatilize at least 95 percent of component (b); and (iii) positioning the composition in contact with the solid polymer electrolyte, if the composition was not applied directly to the solid polymer electrolyte, forming the membrane/electrode assembly thereby.

It has been discovered that the composition and process of the invention, when used to prepare a membrane electrode assembly (MEA) having a solid polymer electrolyte, provides an MEA which provides a relatively high voltage at a given current density and gas flow rate in a fuel cell. It is believed, without intending to be bound by any particular theory, that the improved performance results from the ability of the organic compound to be easily volatized when heated, which is believed to result from a low incidence of ionic, hydrogen, or covalent bonds or partial bonds formed between the organic compound and the polymeric binder, particularly when the binder is in an ionic form. Although the propensity of an organic compound to bond with the binder is difficult to quantify, the characteristics of the organic compound set forth in the above summary are believed to be measurable characteristics, which are indicative of a compound with a minimal or nonexistent propensity to bond with an ionomer or polar polymer. The pKa and basicity parameter reflect the acidity and basicity of the compound, respectively. It is believed that the ease with which the organic compound may be removed from the ink significantly affects the pore characteristics of the resulting active layer. Easy removal of the organic compound is believed to promote a "foaming" effect in the layer, which increases the porosity of the pores of the layer. The pore characteristics affect the transport of water though the layer, which significantly affects the performance of the MEA into which it is incorporated. In addition, if the composition of the invention (hereafter, "catalyst ink") is applied directly to the membrane, it will not cause it to swell excessively, since the organic compound will not bond significantly with the ionomer in the membrane. Further, the composition of the invention permits the use of Na+ or H+ forms of ionomers as the binder without significant degradation thereof when the catalyst ink is heated to volatilize the organic compound, and provides an active layer with good long-term stability. These and other advantages of the invention will be apparent from the description which follows.

DETAILED DESCRIPTION OF THE INVENTION

Figure 1:
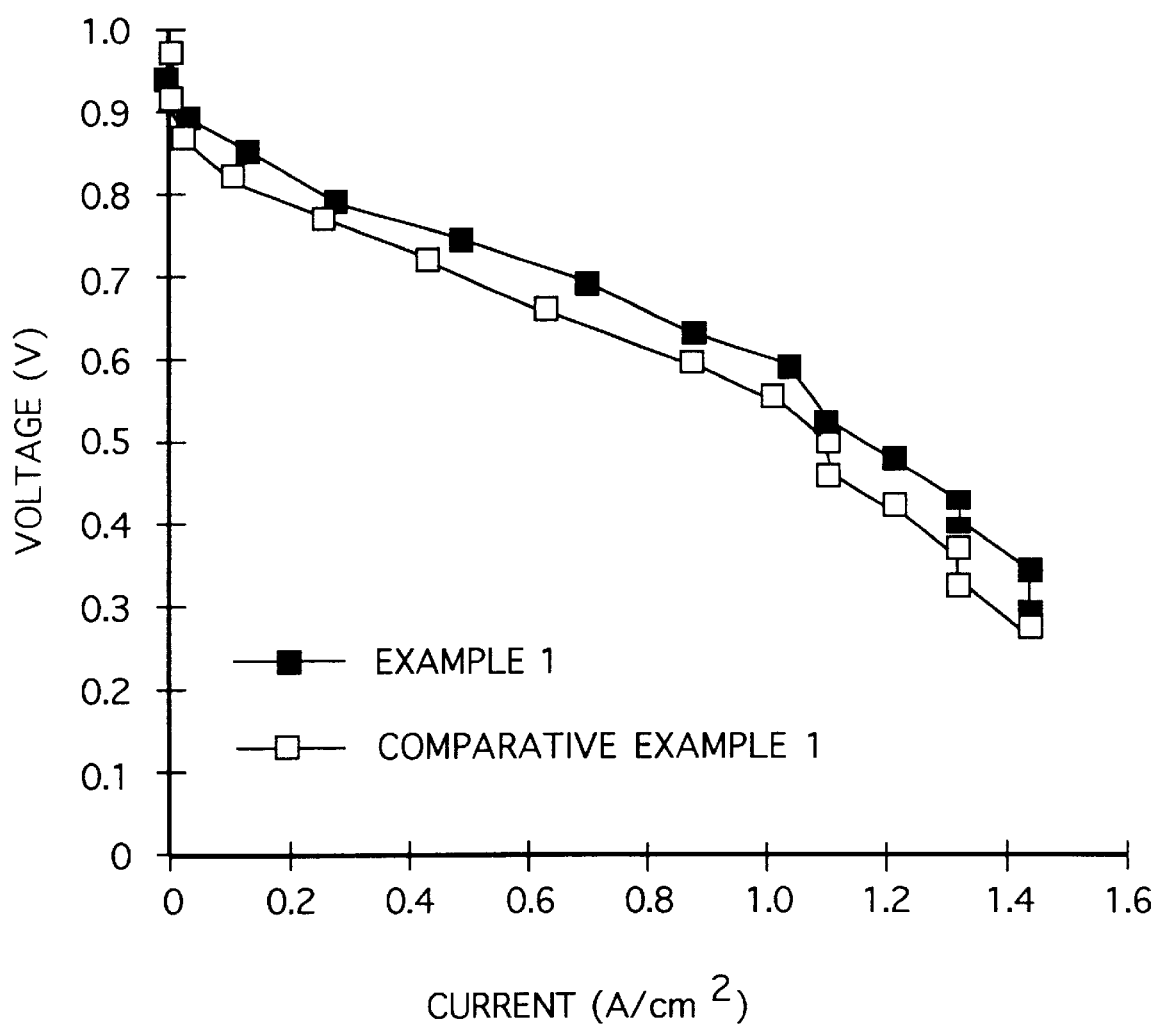
FIG. 1 illustrates the performance of the membrane/electrode assemblies described in Example 1 and Comparative Example 1.

The term "catalytically-active particles" as used herein refers to particles of a metal or compound which is catalytic for the electroreduction of oxygen or electrooxidation of hydrogen or methanol under the pressure and temperature conditions in the fuel cell. Examples of such particles which are useful include particles of platinum, ruthenium, gold, palladium, rhodium, iridium, electroconductive and reduced oxides thereof, and alloys of such materials, either in combination with each other or with other transition metals. The particles may be supported on a suitable material, if desired, such as carbon black. Preferably, the catalytically-active particles are platinum particles supported on carbon, which preferably contain from about 10 percent to about 30 percent by weight of platinum. The size of the catalyst particles (on an unsupported basis) is preferably at least about 10 A°, more preferably at least about 20 A°; but is preferably no greater than about 500 A°, more preferably no greater than about 200 A°. The particles are preferably used in an amount sufficient to provide an optimum catalytic effect under the operating conditions of the electrochemical device in which they are employed. Relative to the amount of binder, however, the particles are preferably present in the ink in an amount, based on the weight of the catalytic particle, including its support, if any, sufficient to provide a weight ratio of component (a):component (c) of at least about 2:1, but preferably no more than about 5:1.

Suitable organic compounds include organic compounds having a pKa (the negative logarithm (to the base 10) of the equilibrium constant, K, for the reaction between the compound and water) of at least about 18 and a basicity parameter, $\beta$, of less than 0.66. Preferably, the pKa is at least about 25. Preferably, $\beta$ is less than about 0.48, and is more preferably less than about 0.40. The basicity parameter for a number of organic compounds, as well as reference procedures for its determination, are described in Kamlet et al., "Linear Solvation Energy Relationships. 23. A Comprehensive Collection of the Solvochromatic Parameters, $\pi^*$, $\alpha$, and $\beta$, and Some Methods for Simplifying the Generalized Solvatochromic Equation," *J. Org. Chem.*, Vol. 48, pp. 2877–2887 (1983).

Preferably, the compound volatilizes at temperatures in the range of from about 100°–250° C. without significant degradation which can impair the performance of the active layer. A relatively low volatization temperature is also preferred, since organic compounds (component (b)) that are not removed from the layer can add to the electrical resistance of the layer, causing poorer MEA performance. This characteristic is particularly important when the binder is utilized in its proton form, since the binder will act as a catalyst to further promote the degradation of any residual organic compound. The use of a proton form of the binder has advantages, however, since quaternary ammonium cations present in an ink composition are difficult to remove and may contribute to a long "break in" period when a fuel cell or fuel cell stack is initially started. Preferably, the boiling point of the solvent is greater than 100° C. so that, upon curing of the ink, the water or low boiling solvents which may be present in the ink (typically introduced to the ink by way of a commercially available binder containing such components) are removed first.

Examples of suitable organic compounds for use as component (b) include ethylene carbonate, propylene carbonate, butylene carbonate, ethylene carbamate, propylene carbamate, and butylene carbamate, acetone, acetonitrile, difluorobenzene, and sulfolane, but is most preferably propylene carbonate. The organic compound is preferably present in an amount, based on the weight of the composition, of at least about 10 percent, more preferably at least about 20 percent, and is most preferably at least about 30 percent; but is preferably no greater than about 90 percent.

Suitable polymeric binders for use in the preparation of the composition of the invention include any polymer or oligomer having ionic conductivity of at least about $1 \times 10^{-3}$ S/cm, more preferably at least about 10–1 S/cm (under the operating conditions of the fuel cell) or electrolytic cell, or which may be reacted with acid or base to generate an oligomer or polymer having ionic conductivity. If the binder has pendant ionic groups, it preferably has an equivalent weight of at least about 600, more preferably at least about 700, and preferably no greater than about 1200, more preferably no greater than about 950. The equivalent weight of the binder is based on the number of pendant ionic groups per molecule, as may be determined by any suitable technique, such as titration with a base, as illustrated in U.S. Pat. No. 4,940,525. Examples of suitable binders include perfluorinated polymers and polytetrafluoroethylene polymers (such as Teflon™, available from DuPont), and polytetrafluoroethylene polymers having pendant sulfonic acid groups, (such as Nafion™, available from DuPont). The binder is preferably present in an amount, based on the weight of the composition, of at least about 0.5 percent but preferably no more than about 5 percent. One advantage of the present invention is that the ionomer may be utilized in any ionic form, such as the proton form or salt form of the oligomer or polymer. Examples of salt forms include quaternary ammonium, sodium, lithium, and potassium.

The MEA may be prepared by any suitable technique, including the process of the second aspect of the invention. Preferably, the MEA is prepared by applying one or more layers of the catalyst ink (the composition of the invention) directly to the solid polymer electrolyte as described, for example, in U.S. Pat. No. 5,211,984. The term "solid polymer electrolyte" as used herein refers to a membrane comprised of a solid polymer which has a conductivity of at least about $1 \times 10^{-3}$ S/cm under the operating conditions of the fuel cell or electrolytic cell, or which may be reacted with acid or base to generate a membrane having such conductivity. Preferably, the solid polymer electrolyte comprises a film of a sulfonated fluoropolymer. Another method comprises applying one or more layers of the catalyst ink to a release material, such as a Teflon™-coated substrate, curing the ink, and then laminating the cured material to the membrane. A third method comprises applying one or more layers of the catalyst ink to one side of a sheet of porous carbon material, such as a carbon or graphite paper, and then placing the side of the material to which the ink was applied adjacent to the membrane. If the ink is cured before being placed next to the membrane, it should then preferably be laminated to the membrane to ensure good contact between the two.

The ink may be cured using any suitable method for removing at least 95 percent of component (b), as well as any other volatile organic solvents contained in the ink, such as by heating at an elevated temperature optionally under reduced pressure. Preferably, the ink is heated to a temperature at which the component (b) is volatile, but below its boiling point. If more than one ink is used to prepare the active layer of the MEA, the inks preferably contain a polytetrafluoroethylene polymer having pendant sulfonic acid groups as the binder, and the layer of ink closest to the membrane has an equivalent weight which differs from the equivalent weight of the binder in the ink layer adjacent thereto by at least about 50. Further, the layer having the lowest equivalent weight binder is preferably positioned adjacent to the solid polymer electrolyte.

Preferably, the ink is heated under conditions sufficient to remove at least 99 percent, more preferably at least 99.9 percent of component (b). The ink is applied in an amount sufficient to provide a layer of the composition which, when dry and protonated, has a thickness of at least about 1 $\mu$m, more preferably at least about 5 $\mu$m, and most preferably at least about 10 $\mu$m; but is preferably no greater than about 30 $\mu$m. The porosity of the layer is preferably at least about 30 percent, more preferably at least about 50 percent; but is preferably no greater than about 90 percent, more preferably no greater than about 60 percent. The mean pore side of the layer is preferably at least about 0.01 $\mu$m, more preferably at least about 0.03 $\mu$m; but is preferably no greater than about 10 $\mu$m, more preferably no greater than about 0.5 $\mu$m, and is most preferably about 0.1 $\mu$m.

Illustrative Embodiments

The following examples are given to illustrate the invention and should not be interpreted as limiting it in any way. Unless stated otherwise, all parts and percentages are given by weight.

EXAMPLE 1

A membrane/electrode assembly is prepared as follows: An ion exchange membrane prepared from perfluorosulfonic acid ionomer having an equivalent weight (EW) of 800, a thickness of 2.4 mil dried and 5 mil fully-hydrated, available from The Dow Chemical Company, is obtained and cut into sheets 11 cm by 11 cm and placed into a NaOH bath to convert it to the Na+ form. The electrode ink is prepared by mixing 1.08 g of a 5.79 weight percent solution of the ionomer (in a 50:50 volume percent ethanol/water solution), 0.1875 g of 20 weight percent platinum on carbon (available from E-TEK, Natick, Mass.), 0.114 g of tetrabutylammonium hydroxide (TBAOH), and 0.6 g of propylene carbonate. The mixture is agitated with a stir bar overnight or until the mixture is uniformly dispersed. An additional 1.2 g of propylene carbonate is then added to the mixture.

The catalyst ink is painted onto clean, 9 cm$^2$ Teflon-coated fiberglass blanks (CHR Industries, New Haven, Conn.), which have been dried in an oven at 110° C. and pre-weighed. The blanks are painted twice with the catalyst ink, which is completely dried before the application of the second layer. The MEA is formed by aligning a coated blank on each side of the ionomer membrane which has been dried on a vacuum table. The blanks and membrane are placed into a press at 195° C. and pressed at a pressure of 100 pounds per cm$^2$ of blank for 5 minutes. The press package is allowed to cool to room temperature before opening. The blank is peeled away from the catalyst layer, leaving the film adhered to the surface of the membrane. Platinum loadings and catalyst layer thicknesses are 0.14 mg/cm$^2$ and 10 μm on the anode side the membrane, 0.25 mg/cm$^2$ and 17 μm on the cathode side of the membrane, respectively.

Separate intermediate layers (between the MEA and flow field) of a graphite cloth impregnated with C/Teflon (available as ELAT from E-TEK, Inc., Natick, Mass.) are placed next to both active layers in the cell assembly and are held in place by a Teflon gasket and the cell compression. The resulting assemblies are then tested in a test fuel cell prepared by Fuel Cell Technologies, Inc. (Santa Fe, N. Mex.). The flow fields are comprised of solid graphite blocks with machined-in serpentine channels.

The cell is placed onto a single cell test stand made by Fuel Cell Technologies, Inc. (Sante Fe, N. Mex.). The anode (H$_2$) and cathode (air) flows are held fixed and do not vary with the current density. The flow rates for a given test are defined by specifying a current density. For example, if the anode flow rate of H$_2$ is 2X stoichiometric at 1.0 A/cm$^2$, then the flow rate is twice that which is required to sustain a current density of 1 A/cm$^2$. Thus, when the cell is operating at 0.5 A/cm$^2$, this same flow is 4 times that which is required to sustain the current density. The anode and cathode pressures are held at 30 and 40 psig, respectively. The cell temperature is 80° C. while the external humidifiers are set at 100° C. for the anode and 85° C. for the cathode. The cell is preconditioned at 0.5 V load for 12 hours. The performance of the cell is shown in FIG. 1. The anode flow rate of H$_2$ is 2X stoichiometric at 1.0 A/cm$^2$, and the cathode flow rate of air is 3X stoichiometric at 1.0 A/cm$^2$.

Comparative Example 1
(Not an example of the invention)

A membrane/electrode assembly (MEA 2) is prepared as described in Example 1, except instead of using propylene carbonate, glycerin is used as the liquid carrier. The platinum loadings on the anode and cathode side of the membrane are the same as in Example 1, but the resulting thicknesses of the catalyst layer are 6 μm and 10 μm, respectively. The assembly is tested in a fuel cell as described in Example 1, and the results are shown in FIG. 1.

EXAMPLE 2

A membrane/electrode assembly (MEA 3) is prepared as described in MEA 1 except that no TBAOH is added to the catalyst ink. The platinum loadings and catalyst layer thickness on the anode and cathode side of the membrane are 0.15 mg/cm$^2$, 10 μm and 0.25 mg/cm$^2$, 16 μm, respectively.

Intermediate layers are prepared as follows: An ink is prepared from 3 g of Vulcan XC-72 carbon, 2 g of a 50 weight percent solution of a perfluorocyclobutane polymer (poly(1,1,2-tris(4trifluorovinyloxyphenyl)ethane), prepared as described in U.S. Pat. No. 5,037,917 and B-staged in mesitylene to produce a polymer with an average molecular weight in the range of from about 4,000 to about 8,000) and 31 g of mesitylene. The ink is applied in two applications to a 0.25 g/cm$^3$, 8 mil thick untreated graphite paper having a porosity of about 87 percent and a mean pore size of about 50 microns (Spectracorp, Lawrence, Mass.) to obtain a loading of 2 mg/cm$^2$ polymer and carbon. The ink is not required to completely dry between applications. The solvent is allowed to evaporate and the polymer is fully cured at 200° C. under vacuum for 1 hour. The C/polymer layer is placed next to the active layer in the cell assembly and is held in place by a Teflon gasket and the cell compression.

Figure 2:
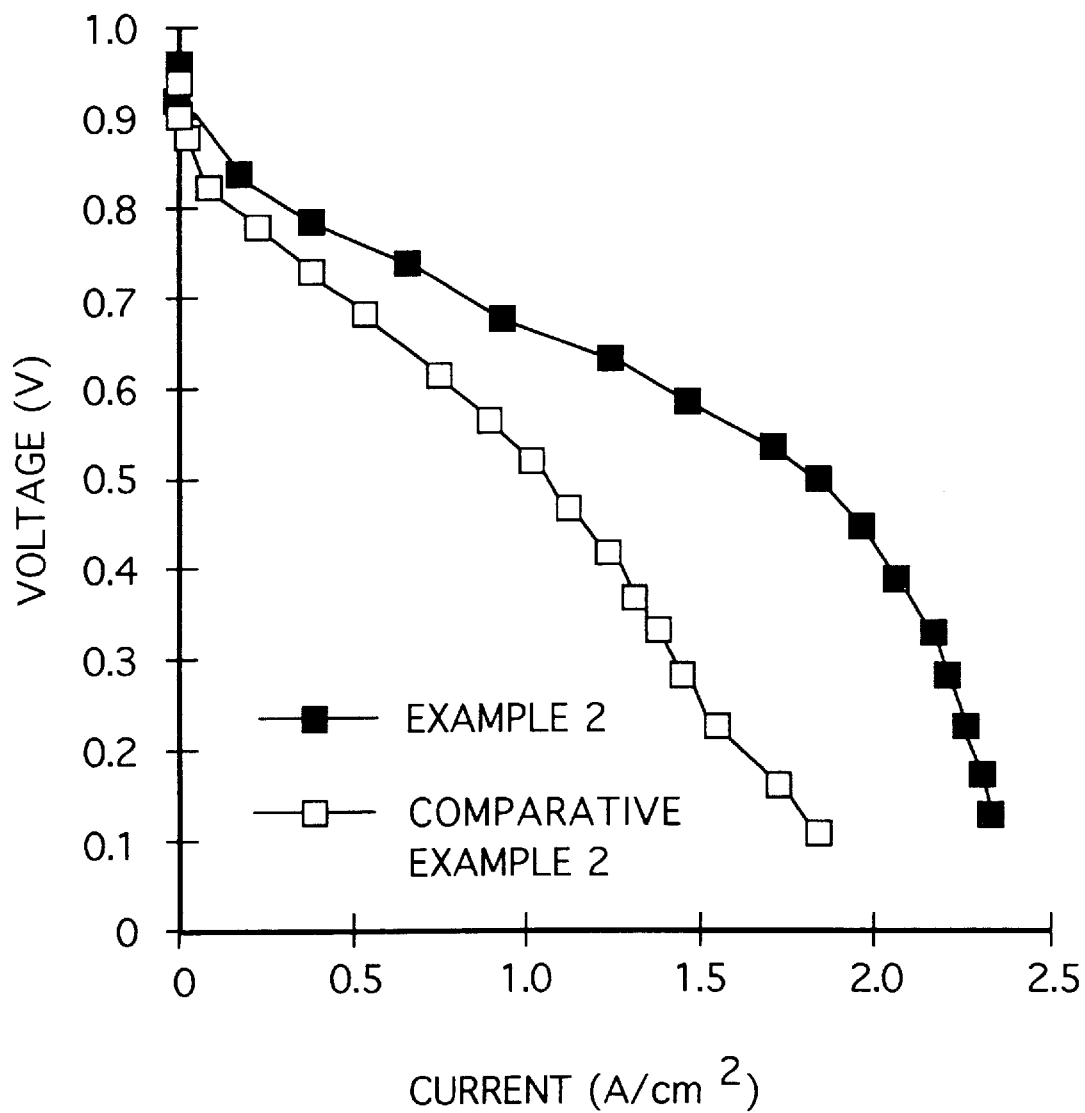
FIG. 2 illustrates the performance of the membrane/electrode assemblies described in Example 2 and Comparative Example 2.

The MEA and intermediate layers are assembled together and tested in a fuel cell as described in Example 1. Although the cell was preconditioned for 12 hours, its peak performance was reached in only 1 hour. The performance curve is shown in FIG. 2. The flow rates are the same of the same as in Example 1.

Comparative Example 2
(Not an example of the invention)

An MEA is prepared as described in Example 1 except that no TBAOH is added to the catalyst ink and glycerin is substituted for propylene carbonate. Intermediate layers are prepared as described in Example 2. The MEA and intermediate layers are assembled together and tested in a fuel cell as described in Example 1. The thickness of the cathode and anode layers are 8 μm and 4 μm, respectively. The performance curve is shown in FIG. 2.

What is claimed is:

1. A composition comprising (a) catalytically active particles, (b) an organic compound having a pKa of at least from about 18 and a basicity parameter, β, of less than 0.66, and (c) a polymeric binder.

2. The composition of claim 1 wherein the binder is a proton form of an ionomer.

3. The composition of claim 1 wherein the binder has an equivalent weight in the range of from about 600 to about 1200.

4. The composition of claim 1 wherein the binder has an equivalent weight in the range of from about 700 to about 950.

5. A composition comprising (a) catalytically-active particles, (b) an organic compound selected from ethylene carbonate, propylene carbonate, butylene carbonate, ethylene carbamate, propylene carbamate, and butylene carbamate, acetone, acetonitrile, difluorobenzene, and sulfolane, and (c) a polymeric binder.

6. A composition comprising (a) catalytically-active particles, (b) propylene carbonate, and (c) a polymeric binder.

* * * * *